US010652260B1

(12) United States Patent
Rodriguez et al.

(10) Patent No.: US 10,652,260 B1
(45) Date of Patent: May 12, 2020

(54) DETECTING BOTNET DOMAINS

(71) Applicant: Cisco Technology, Inc., San Jose, CA (US)

(72) Inventors: David Rodriguez, Berkeley, CA (US); Andrea Michelle Scarfo, San Mateo, CA (US); Dhia Mahjoub, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 269 days.

(21) Appl. No.: 15/806,613

(22) Filed: Nov. 8, 2017

(51) Int. Cl.
*H04L 29/06* (2006.01)
*H04L 29/12* (2006.01)
*H04L 12/26* (2006.01)

(52) U.S. Cl.
CPC .......... *H04L 63/1425* (2013.01); *H04L 43/08* (2013.01); *H04L 61/1511* (2013.01); *H04L 63/1416* (2013.01); *H04L 63/1441* (2013.01); *H04L 61/2007* (2013.01)

(58) Field of Classification Search
CPC ............. H04L 63/1425; H04L 63/1416; H04L 63/1441; H04L 61/1511; H04L 43/08; H04L 61/2007
See application file for complete search history.

(56) References Cited

U.S. PATENT DOCUMENTS

| 8,185,953 | B2 * | 5/2012 | Rothstein | H04L 63/1416 726/22 |
| 8,402,529 | B1 * | 3/2013 | Green | H04L 63/1416 726/11 |
| 2010/0257580 | A1 * | 10/2010 | Zhao | H04L 43/00 726/1 |
| 2010/0287151 | A1 * | 11/2010 | Mustonen | H04L 63/0227 707/707 |

(Continued)

OTHER PUBLICATIONS

Zhauniarovich et al. "A Survey on Malicious Domains Detection through DNS Data Analysis" teaches a survey of the art concerning current practices at detecting malicious domains, May 22, 2018, ACM Computing Surveys, vol. 1. No. 1. Article 1, pp. 1-35.*

(Continued)

*Primary Examiner* — Theodore C Parsons
*Assistant Examiner* — Thomas Ho
(74) *Attorney, Agent, or Firm* — Edell, Shapiro & Finnan, LLC

(57) ABSTRACT

A method and an apparatus for detecting botnet domains is described. In one embodiment, the method includes monitoring network traffic associated with a plurality of clients in a network. Based on the monitoring, information related to a plurality of domains that are queried is stored. The method includes identifying one or more suspect clients in the network based on the stored information and determining a subset of suspect domains based on the stored information related to the domains queried by the suspect clients. The (Continued)

method can include determining client activity information and using the client activity information to determine a polytope region for a client. The method includes comparing each suspect domain to the polytope region and associating a domain with a group of blocked domains if the domain falls within the polytope region.

20 Claims, 8 Drawing Sheets

(56) References Cited

U.S. PATENT DOCUMENTS

| | | | | |
|---|---|---|---|---|
| 2010/0319069 | A1* | 12/2010 | Granstedt | H04L 63/0263 726/22 |
| 2011/0231770 | A1* | 9/2011 | Tovar | G06F 21/6218 715/736 |
| 2012/0198549 | A1* | 8/2012 | Antonakakis | H04L 61/1511 726/22 |
| 2012/0303808 | A1* | 11/2012 | Xie | H04L 63/0236 709/225 |
| 2013/0179974 | A1* | 7/2013 | Manadhata | H04L 63/145 726/24 |
| 2013/0268675 | A1* | 10/2013 | Tsai | H04L 61/1511 709/226 |
| 2013/0318603 | A1* | 11/2013 | Merza | H04L 63/1441 726/22 |
| 2014/0007238 | A1* | 1/2014 | Magee | G06F 21/577 726/24 |
| 2014/0373148 | A1* | 12/2014 | Nelms | H04L 63/1441 726/23 |
| 2015/0019708 | A1* | 1/2015 | Denis | H04L 43/04 709/224 |
| 2016/0285894 | A1* | 9/2016 | Nelms | H04L 63/145 |
| 2017/0041332 | A1* | 2/2017 | Mahjoub | H04L 61/1511 |
| 2017/0103111 | A1* | 4/2017 | Lavin | G06F 16/2423 |
| 2018/0337947 | A1* | 11/2018 | Schiffman | H04L 41/0631 |
| 2018/0351977 | A1* | 12/2018 | Carothers | H04L 63/1425 |
| 2019/0026466 | A1* | 1/2019 | Krasser | G06N 3/0454 |

OTHER PUBLICATIONS

Antonakakis, et al., "From Throw-Away Traffic to Bots: Detecting the Rise of DGA-Based Malware", Damballa Inc., University of Georgia, Georgia Institute of Technology, 21st USENIX Security Symposium, Aug. 8-10, 2012, 16 pgs.

Yadav, et al., "Detecting Algorithmically Generated Domain-Flux Attacks with DNS Traffic Analysis", IEEE/ACM Transactions on Networking ( vol. 20, Issue: 5, Oct. 2012 ), 15 pgs.

Schiavoni, et al., "Tracking and Characterizing Botnets Using Automatically Generated Domains", Nov. 21, 2013, 14 pgs.

Thomas, et al., "Kindred Domains: Detecting and Clustering Botnet Domains Using DNS Traffic", International World Wide Web Conference Committee (IW3C2), Apr. 7-11, 2014, 6 pgs.

* cited by examiner

DETECTING BOTNET DOMAINS

TECHNICAL FIELD

This disclosure relates generally to security for a network.

BACKGROUND

A botnet is made up of any number and type of Internet-connected devices that are running bots. Typically, the botnet includes various computers and other devices that have infected with malware. The master of the botnet controls the botnet remotely by communicating with the infected devices using command and control software. The command and control software can be hosted on botnet domains that the master of the botnet uses to establish communication channels with the infected devices and send commands to remotely control the infected devices of the botnet.

One tool used by botnet masters to create botnet domains is domain generation algorithms (DGA). Using DGA, an infected device can periodically generate a large number of domain names that can be used to establish communication with command and control software. The large number of potential domains generated by DGA makes it difficult to shut down the botnet and sever the communication link between the botnet and the command and control software.

DESCRIPTION OF EXAMPLE EMBODIMENTS

Overview

Presented herein is a method for detecting botnet domains. In an example embodiment, a method includes monitoring network traffic associated with a plurality of clients in a network. Based on the monitoring, information is stored related to a plurality of domains that are queried by the plurality of clients. One or more suspect clients of the plurality of clients in the network are identified based on the stored information. A subset of suspect domains of the plurality of domains is determined based on the stored information related to the plurality of domains queried by the one or more suspect clients. Based on the monitoring and the storing, determining client activity information is determined related to: (i) a number of clients querying each domain of the subset of suspect domains, (ii) identities of the clients querying each domain of the subset of suspect domains, (iii) a number of total domains each of the clients queries over a defined time window, and (iv) for each domain of the subset of suspect domains, a proportion of the clients that query that domain over two consecutive time windows. A polytope region for a first client of the one or more suspect clients is determined based on the client activity information. Each domain of the subset of suspect domains is compared to the polytope region for the first client. A domain of the subset of suspect domains is associated with a group of blocked domains if the domain falls within the polytope region for the first client.

Example Embodiments

Figure 1:
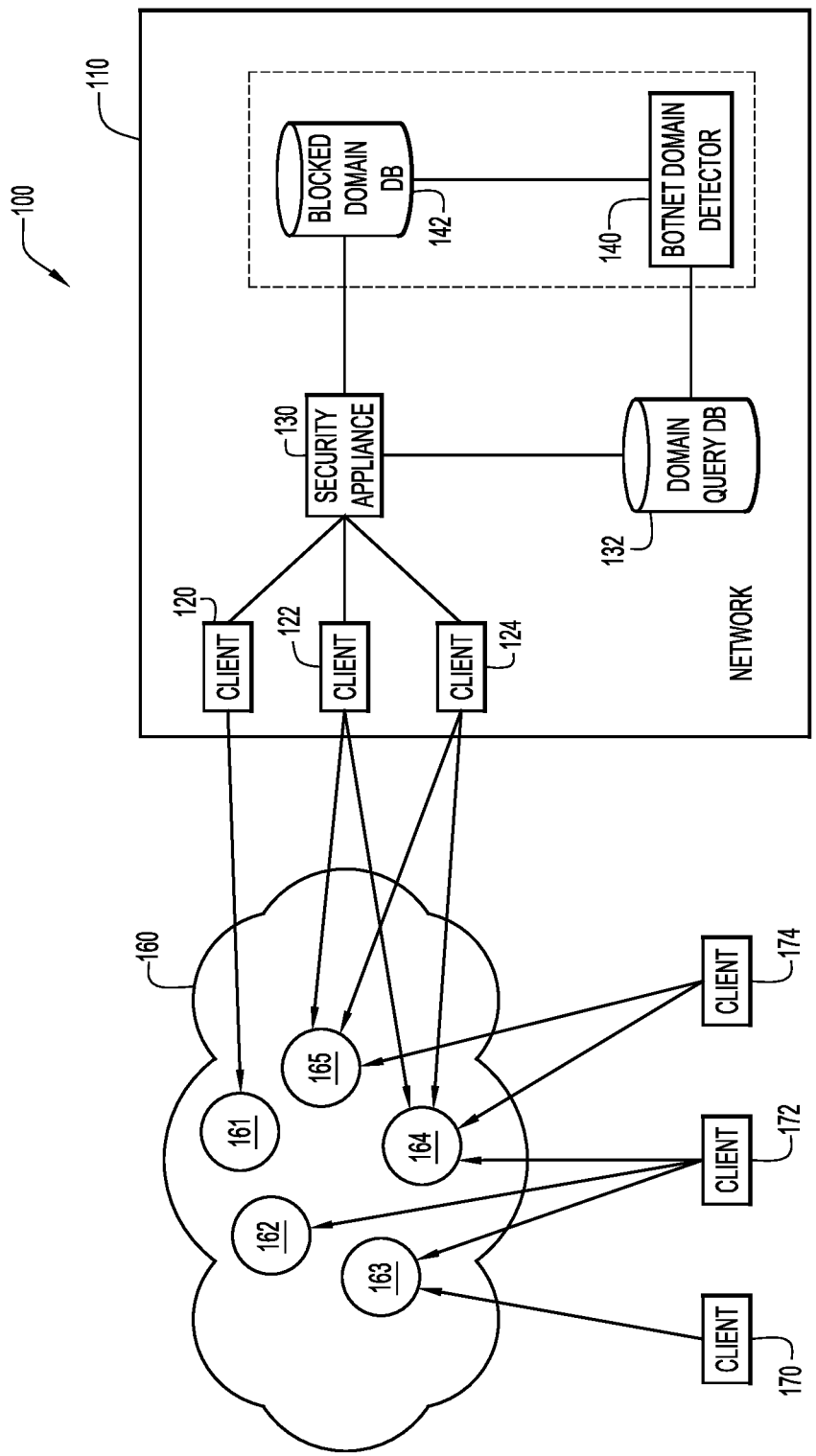
FIG. 1 is a block diagram showing an example of a network in which a method for detecting botnet domains may be employed, according to an example embodiment.

FIG. 1 is a block diagram showing a functional view of an example of a system 100 including a network 110 in which a method of detecting botnet domains can be implemented, according to an example embodiment. Network 110 may be an enterprise network that includes a plurality of clients, including a first client 120, a second client 122, and a third client 124, that are monitored and controlled by a security appliance 130 for network 110. Network 110 may also include a domain query database 132 that stores information associated with queries generated by the plurality of clients, and a botnet domain detector 140. In an example embodiment, botnet domain detector 140 may be configured to determine botnet domains and associate those domains with a blocked domain database 142, as will be described in more detail below.

In an example embodiment, the plurality of clients on network 110 may query and attempt to communicate with a plurality of domains 160. Additionally, a plurality of other clients outside of network 110, including clients 170, 172, 174, may also query and attempt to communicate with plurality of domains 160. In this example embodiment, the plurality of domains 160 may include a first domain 161, a second domain 162, a third domain 163, a fourth domain 164, and a fifth domain 165 by way of example only. It should be understood that plurality of domains 160 may include a large number of domains.

In an example embodiment, network traffic, such as queries and/or access to the plurality of domains 160 requested by the network clients 120, 122, 124, may be monitored and controlled by a security appliance 130 within network 110. Security appliance 130 may be any appliance that is configured to monitor network 110 and the plurality of clients to implement security policies. For example, security appliance 130 may be a gateway, access control device, firewall, server, or other appliance running on hardware, software, or a combination of both. When one of the plurality of network clients, including first client 120, second client 122, and/or third client 124, queries or attempts to access one of the plurality of domains 160, security appliance 130 may maintain a record of the query and/or access attempt in domain query database 132. For example, domain query database 132 may be embodied by a storage device storing a plurality of query logs for plurality of network clients 120, 122, 124. The query logs may include stored information related to plurality of domains 160, such as domain name system (DNS) records that identify a requestor client Internet Protocol (IP) address and a requested domain.

In an example embodiment, the plurality of network clients 120, 122, 124 and/or the plurality of other clients, 170, 172, 174 may be a variety of different types of clients, including an apparatus, device, software, appliance, or other component embodied in hardware, software, or a combination of both. For example, clients may be computers, servers, smartphones, Internet-of-Things (IoT) devices (e.g., light bulbs, outlets, cameras, appliances, thermostats, etc.), or any other device or component that can connect to the Internet and query a domain.

As will be further described below, and in accordance with the principles of the example embodiments, botnet domains may be identified by analyzing the behavior of clients that appear to be infected. That is, by recognizing and determining a pattern of behavior with regard to domains queried by infected clients, the identity of the domains used for command and control, (i.e., botnet domains) may be determined. Once the botnet domains have been identified, then they may be appropriately blocked or disabled to disrupt the botnet master's control over the infected devices in the botnet.

Figure 2:
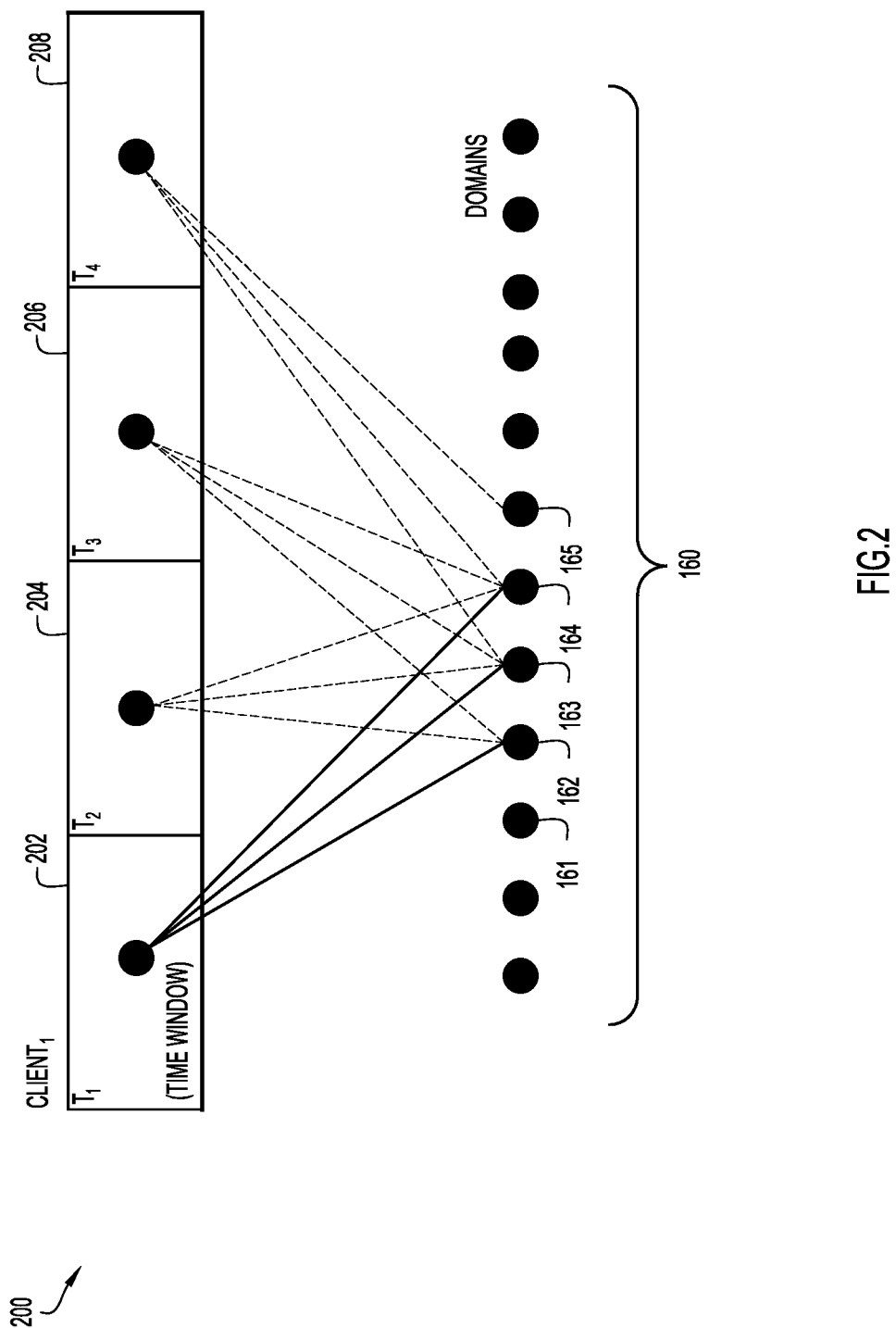
FIG. 2 is a diagram illustrating a representative client infected by malware querying domains over multiple time windows, according to an example embodiment.

For example, the behavior of a representative client 200 is illustrated in FIG. 2. In an example embodiment, client 200 may be observed querying one or more domains of plurality of domains 160 over a series of consecutive time windows, including a first time window 202, a second time window 204, a third time window 206, and a fourth time window 208. In this example, client 200 queries second domain 162, third domain 163, and fourth domain 164 during first time window 202. During second time window 204, client 200 again queries second domain 162, third domain 163, and fourth domain 164. Similarly, during third time window 206, client 200 once more queries second domain 162, third domain 163, and fourth domain 164. Finally, during fourth time window 208, client 200 queries third domain 163 and fourth domain 164, as well as fifth domain 165.

A suspect client may be determined to be infected (i.e., acting bot-like) when it queries the same domains over and over, from one time window to the next. This type of behavior indicates that the client is likely infected with malware that is causing the client to execute the queries to the domains as observed. For example, the infected client may be executing a DGA, as described above. As shown in FIG. 2, client 200 is identified as a suspect client by recognizing that it has queried the same three domains, second domain 162, third domain 163, and fourth domain 164, in three of the four consecutive time windows, first time window 202, second time window 204, and third time window 206. Based on this behavior, client 200 may be identified as a suspect client.

Typically, a botnet is made up of a large number of bot-like clients that are infected with the same malware, which causes the clients to execute similar instructions. According to the principles of the example embodiments, additional suspect clients may be found based on information about other suspect clients. That is, the additional suspect clients may be identified based on determining that a client is exhibiting behavior that is similar to the behavior of a suspect client.

Figure 3:
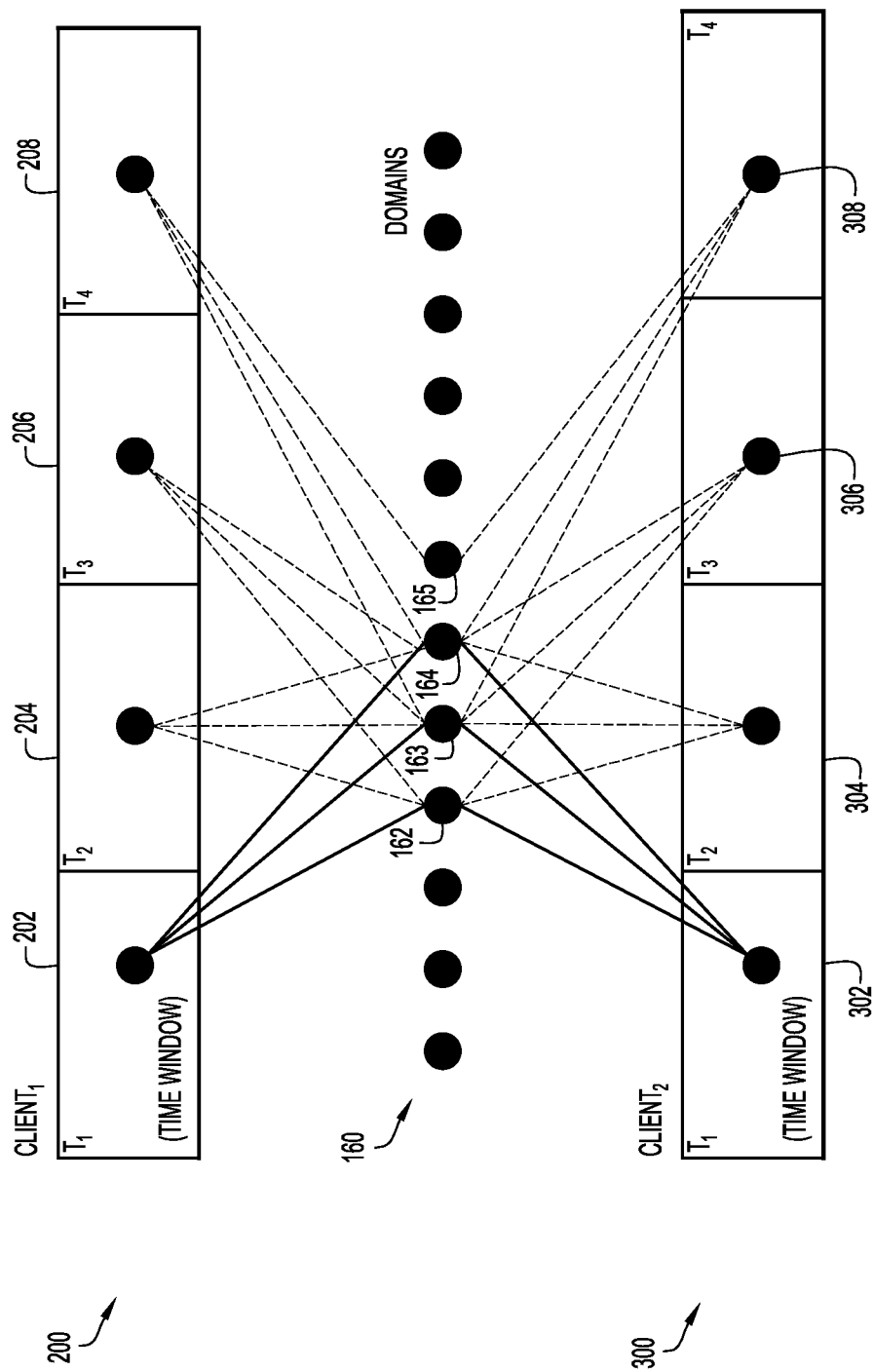
FIG. 3 is a diagram illustrating two different representative clients infected by malware querying similar domains over multiple time windows, according to an example embodiment.

For example, the behavior of a second representative client 300 is compared with client 200 in FIG. 3. In this example, suspect client 200 has been determined to likely be infected with malware based on its behavior as described above. In FIG. 3, second client 300 may be observed querying one or more domains of plurality of domains 160 over a series of consecutive time windows, including a first time window 302, a second time window 304, a third time window 306, and a fourth time window 308. In this example, second client 300 queries second domain 162, third domain 163, and fourth domain 164 during first time window 302. During second time window 304, second client 300 again queries second domain 162, third domain 163, and fourth domain 164. Similarly, during third time window 306, second client 300 once more queries second domain 162, third domain 163, and fourth domain 164. Finally, during fourth time window 308, second client 300 queries third domain 163 and fourth domain 164, as well as fifth domain 165. Thus, the behavior of second client 300 is similar to, or mirrors, the behavior of suspect client 200. As a result, it is also likely that second client 300 is a suspect client that has been infected with malware and is acting bot-like in the same or similar manner as client 200.

In accordance with the principles of the example embodiments, botnet domains may be identified on the basis of the similarity in behavior of suspect clients, i.e., the clients likely infected by malware. The botnet domains queried by the suspect clients all have approximately the same number of clients querying them. The number of domains that the suspect clients query is approximately the same. Additionally, the suspect clients repeat themselves over consecutive time windows approximately the same amount.

Figure 4:
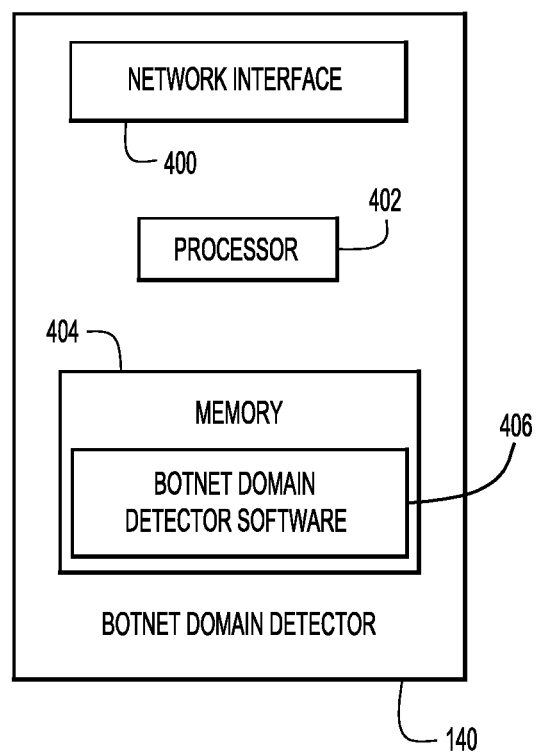
FIG. 4 is a block diagram of a botnet domain detector configured to detect botnet domains, according to an example embodiment.

FIG. 4 shows a block diagram of botnet domain detector 140 configured to detect botnet domains using the techniques described herein, according to an example embodiment. In some embodiments, botnet domain detector 140 may reside within network 110. For example, the functions of botnet domain detector 140 may be implemented by hardware, software, or a combination of both provided within network 110. In one example embodiment, botnet domain detector 140 may be an appliance or application within security appliance 130 that executes instructions to implement the method of detecting botnet domains described herein. In other embodiments, botnet domain detector 140 may be a separate component or appliance that resides remote from network 110. For example, the functions of botnet domain detector 140 may be implemented by hardware, software, or a combination of both that is accessible to network 110 and/or security appliance 130 through a communication network, such as the Internet.

FIG. 4 illustrates an example embodiment of an apparatus of botnet domain detector 140 upon which the embodiments presented may be implemented. Botnet domain detector 140 includes a network interface 400, a processor 402 for processing information and may further include a bus (not shown) or other communication mechanism coupled with processor 402 for communicating the information. The network interface 400 may be, for example, one or more network interface cards configured to enable network communications. While the figure shows a single block 402 for a processor, it should be understood that the processor 402 may represent a plurality of processing cores, each of which can perform separate processing.

Botnet domain detector 140 may also include a memory 404, such as a random access memory (RAM) or other dynamic storage device (e.g., dynamic RAM (DRAM), static RAM (SRAM), and synchronous DRAM (SD RAM)), coupled to the bus for storing information and instructions to be executed by processor 402. For example, botnet domain detector software 406 is stored in memory 404 for providing one or more of the functions of botnet domain detector 140 described herein. In addition, main memory 404 may be used for storing temporary variables or other intermediate information during the execution of instructions by processor 402.

Botnet domain detector 140 may further include other components not explicitly shown or described in the example embodiments. For example, botnet domain detector 140 may include a read only memory (ROM) or other static storage device (e.g., programmable ROM (PROM), erasable PROM (EPROM), and electrically erasable PROM (EEPROM)) coupled to the bus for storing static information and instructions for processor 402. Botnet domain detector 140 may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to botnet domain detector 140 using an appropriate device interface (e.g., small computer system interface (SCSI), integrated device electronics (IDE), enhanced-IDE (E-IDE), direct memory access (DMA), or ultra-DMA).

Botnet domain detector 140 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

Botnet domain detector 140 performs a portion or all of the processing steps of the process in response to processor 402 executing one or more sequences of one or more instructions contained in a memory, such as main memory 404. Such instructions may be read into main memory 404 from another computer readable medium, such as a hard disk or a removable media drive. One or more processors in a multi-processing arrangement may also be employed to execute the sequences of instructions contained in main memory 404. In alternative embodiments, hard-wired circuitry may be used in place of or in combination with software instructions. Thus, embodiments are not limited to any specific combination of hardware circuitry and software.

As stated above, botnet domain detector 140 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling botnet domain detector 140, for driving a device or devices for implementing the process, and for enabling botnet domain detector 140 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

Figure 5:
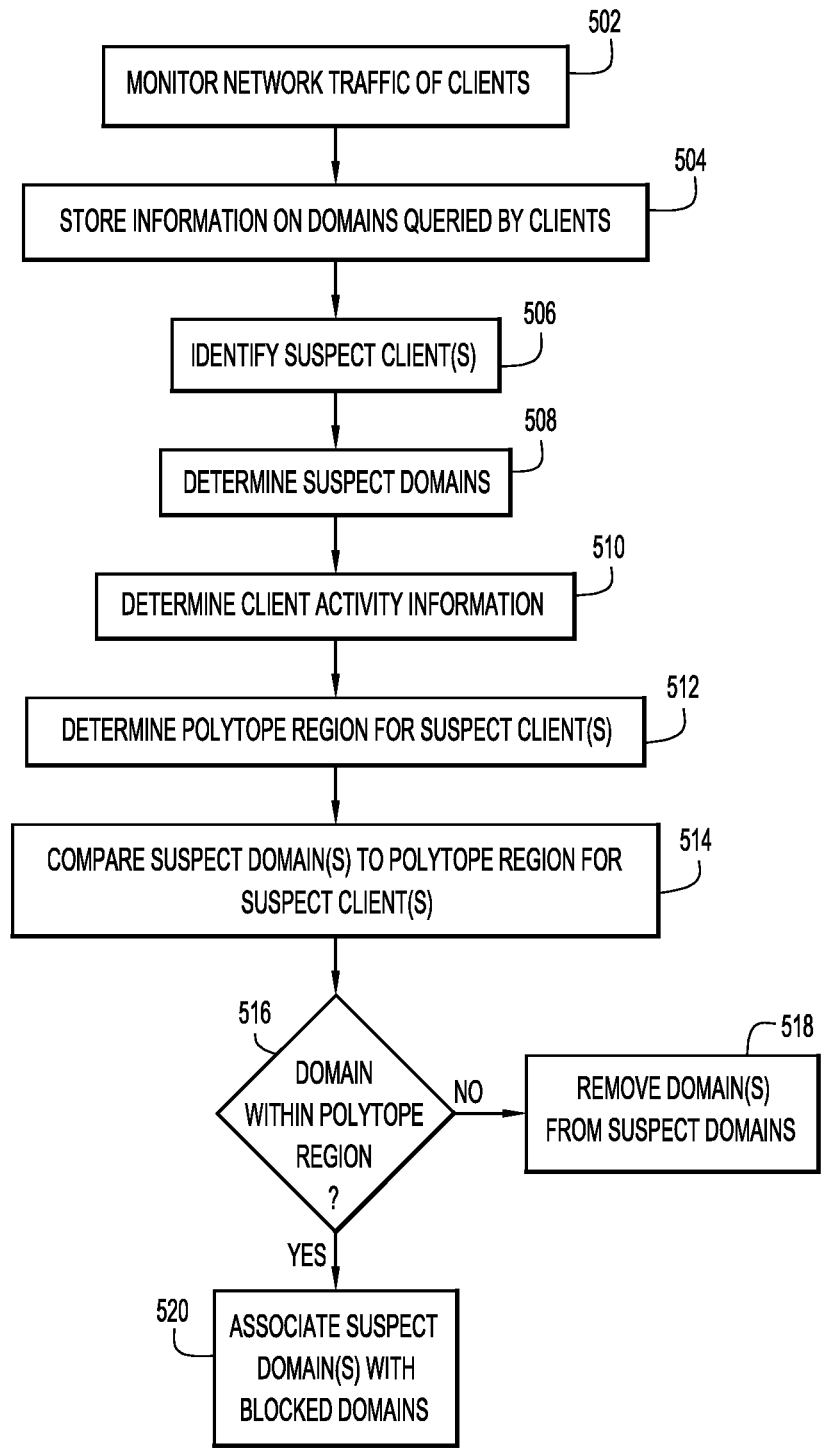
FIG. 5 is a flowchart of a method for detecting botnet domains, according to an example embodiment.

FIG. 5 is a flowchart of method 500 for detecting botnet domains, according to an example embodiment. Reference is also made to FIG. 1 for purposes of this description of FIG. 5. Method 500 may begin with operation 502, where network traffic by clients is monitored. For example, as shown in FIG. 1, network 110 may include the plurality of network clients 120, 122, 124. Requests or queries from the plurality of network clients 120, 122, 124 may be monitored by security appliance 130 or some other component within network 110 that is configured to monitor access requests by clients. Next, at operation 504, information related to the domains queried by clients within network 110 is stored. For example, as shown in FIG. 1, network 110 may include query database 132 that is configured to store information related to domains of plurality of domains 160 queried or accessed by plurality of network clients 120, 122, 124. As noted above, the stored information related to plurality of domains 160 may include DNS records that identify a requestor client IP address and a requested domain.

At operation 506, one or more suspect clients may be identified. In an example embodiment, one or more suspect clients of a plurality of clients, including the plurality of network clients 120, 122, 124 and/or the plurality of clients 170, 172, 174, may be identified by evaluating stored information related to plurality of domains 160. For example, as noted previously, stored information related to plurality of domains 160 may include DNS records that identify a requestor client IP address and a requested domain. In an example embodiment, identifying the one or more suspect clients includes evaluating a relationship between the plurality of clients with domains of the plurality of domains 160 queried by clients over consecutive time windows.

For example, if a client has queried at least two similar domains of the plurality of domains 160 as at least one other client, and if a client has made a substantially similar number of queries to domains in the plurality of domains 160 over a defined time window as at least one other client, then the client can be considered to be a suspect client. That is, it is likely that the client is infected with malware and is acting bot-like. Using the stored information related to the plurality of domains 160, similar behavior by other clients of the plurality of network clients 120, 122, 124 and/or the plurality of clients 170, 172, 174 may be identified to determine the group of one or more suspect clients.

At operation 508, a subset of suspect domains may be determined based on the domains queried by the one or more suspect clients identified in operation 506. That is, at operation 508, the domains queried by each of the suspect clients that are likely infected with malware are considered to be potential botnet domains. By way of reference again to FIG. 1, a subset of suspect domains of the plurality of domains 160 may be determined based on stored information in domain query database 132 related to particular domains of the plurality of domains 160 queried by the one or more suspect clients. For example, consider the case in FIG. 1 where the second client 122 and the third client 124 have been identified as suspect clients. In this example, the subset of suspect domains would include at least fourth domain 164 and fifth domain 165 of the plurality of domains 160, since those domains were queried by suspect clients, e.g., the second client 122 and the third client 124. The subset of suspect domains may not, however, include first domain 161, since that domain was only queried by first client 120, which was not considered a suspect client.

Next, at operation 510, client activity information associated with the subset of suspect domains is obtained. In an example embodiment, obtaining the client activity information for the subset of suspect domains includes determining client activity information related to: (i) a number of clients querying each domain of the subset of suspect domains, (ii) identities of the clients querying each domain of the subset of suspect domains, (iii) a number of total domains each of the clients queries over a defined time window, and (iv) for each domain of the subset of suspect domains, a proportion of the clients that query that domain over two consecutive time windows. For example, this client activity information may be obtained based on stored information in domain query database 132, as well as additional information related to the suspect domains obtained from a variety of DNS services.

At operation 512, a polytope region may be determined for each suspect client. In an example embodiment, a polytope region is an intersection of two or more client activity information factors that define a space into which botnet domains will fall. Each client activity information factor may be defined by an average value and standard deviation. Accordingly, the extent of the polytope region for a given client activity information factor will be defined by the average value of that factor+/−the standard deviation for that factor. In an example embodiment, the client activity information obtained from operation 510 may be used at operation 512 to determine at least three client activity information factors for a polytope region that can be used to evaluate the possibility that a suspect domain may be a botnet domain.

In an example embodiment, the first factor may be related to a domain's popularity. That is, the first factor may be a function of the number of clients that are querying a domain. The second factor may be related to a client's chattiness or query rate. For example, the second factor may be a function of the number of total domains a client queries over a defined time window. The third factor may be related to a degree of similarity of clients. For example, the third factor may be a function of the proportion of clients that query a domain over two consecutive time windows. Further details regarding the determination of a polytope region and its use for determining whether or not a suspect domain is a botnet domain is explained below.

At operation 514, each of the domains in the subset of suspect domains is compared to the polytope region for each of the suspect clients. For example, consider the case in FIG. 1 where second client 122 and third client 124 have been identified as suspect clients and the subset of suspect domains includes at least fourth domain 164 and fifth domain 165 of plurality of domains 160. In this example, at operation 514, fourth domain 164 and fifth domain 165 would be compared with the polytope region for second client 122 and would also be compared with the polytope region for third client 124.

Based on the comparison to the polytope region at operation 514, operation 516 presents two possible outcomes for the comparison. If the result at operation 516 is "NO", i.e., the suspect domain does not fall within the polytope region, then that domain may be removed from the subset of suspect domains at operation 518. In other words, method 500 has determined that the domain is not likely to be a botnet domain. Accordingly, the domain need not be included in blocked domain database 142.

If the result at operation 516 is "YES", i.e., the suspect domain does fall within the polytope region, then that domain may be considered a likely botnet domain. Accordingly, at operation 520, the suspect domain may be associated with other blocked domains by being added to blocked domain database 142.

Upon the completion of operation 516 for each suspect client polytope region and domain of the subset of suspect domains, method 500 may end. Alternatively, method 500 may start over from the beginning, at operation 502 where network traffic can be monitored until another suspect client is identified and the process of method 500 may continue again to detect botnet domains.

FIGS. 6 through 9 illustrate further details of operations of method 500 for detecting botnet domains, according to example embodiments. Reference is also made to FIG. 5 for purposes of the descriptions of FIGS. 6 through 9.

Figure 6:
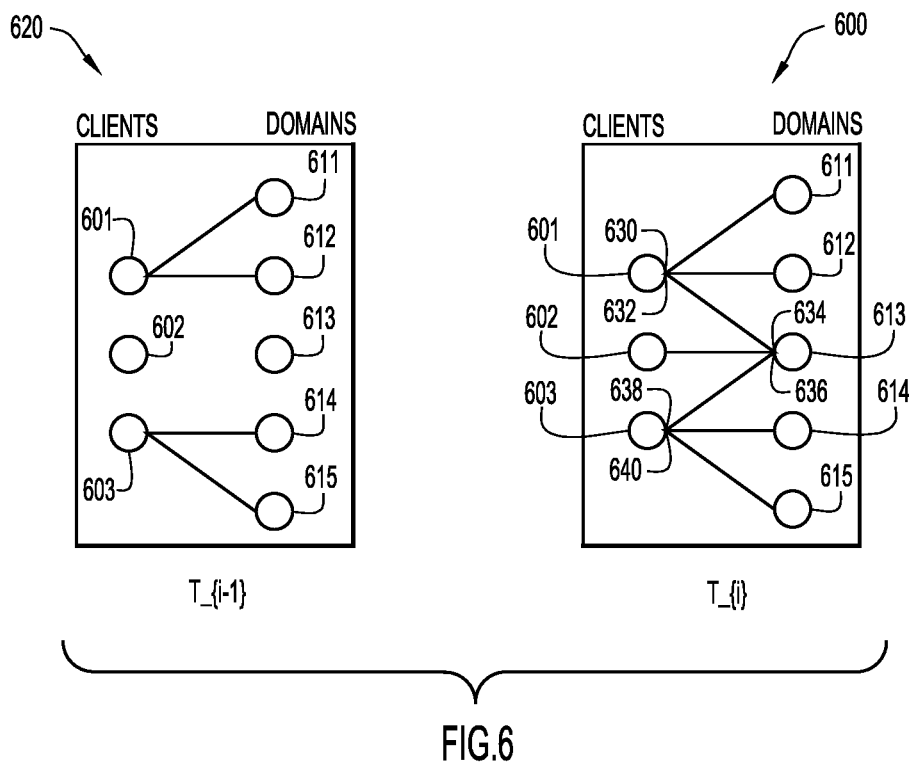
FIG. 6 is a representative view of bipartite graphs associating clients and domains over two consecutive time windows, according to an example embodiment.

Referring now to FIG. 6, example embodiments of bipartite graphs associating clients and domains over two consecutive time windows is shown for use in identifying suspect clients. In this example, stored information related to clients and the domains the clients query may be used to form a first bipartite graph 600 for a first time window $T_{\{i\}}$ and a second bipartite graph 620 for a second time window $T_{\{i-1\}}$.

The stored information related to plurality of domains 160 may include DNS records that identify a requestor client IP address and a requested domain. The stored information may also include other information, such as QTYPE information that identifies the resource records being requested, RTYPE information that identifies the response type to the query, and other information specified for RFC-compliant DNS services. For example, bipartite graphs 600, 620 may be formed using the stored information on the domains queried by clients obtained at operation 504 of method 500 described above.

In an example embodiment, first bipartite graph 600 for the first time window pairs a plurality of clients, including a first client 601, a second client 602, and a third client 603, with a plurality of domains queried by those clients, including a first domain 611, a second domain 612, a third domain 613, a fourth domain 614, and a fifth domain 615. In first bipartite graph 600, first client 601 has queried first domain 611, second domain 612, and third domain 613, second client 602 has queried second domain 612, and third client 603 has queried third domain 613, fourth domain 614, and fifth domain 615.

Second bipartite graph 620 shows the queries for the same clients as in first bipartite graph 600 over a second time window, for example, the previous time window. Accordingly, in the previous time window, first client 601 has queried first domain 611 and second domain 612, second client 602 has not made any queries, and third client 603 has queried fourth domain 614 and fifth domain 615.

Time windows may be various predefined periods of time. For example, a time window may be approximately one hour. In other embodiments, the time windows may be reduced. For example, a time window may be on the order of several seconds, such as 5 or 10 seconds, or may be on the order of sub-seconds. Similarly, time windows may also be expanded to larger periods of time. Selection of time window may be based, at least in part, on the capabilities and capacity of a given network and its monitoring needs. For example, a network with many clients may require smaller time windows than a network with fewer clients, so that botnet domains may be quickly detected and blocked.

The information provided by first bipartite graph 600 and second bipartite graph 620 may be used to determine several metrics associated with the relationships between clients and the domains visited by the clients. These metrics may be used to evaluate clients to determine suspect clients and may also be used in determining polytope regions for detecting botnet domains, as described below. In an example embodiment, first bipartite graph 600 and second bipartite graph 620 may be used to determine a node degree, an average neighbor node degree, and a median neighbor node degree.

First, to determine a node degree, let v be a vertex in a bipartite graph, for example, first bipartite graph 600 for first time window $T\_\{1\}$, and let N(v) be the adjacent vertices. In the case of first bipartite graph 600, vertex v may be the vertex 630 between the link from first client 601 to first domain 611 and the link from first client 601 to second domain 612. The adjacent vertices N(v) can include the vertex 632 between the link from first client 611 to second domain 612 and the link from first client 611 to third domain 613, the vertex 634 between the link from third domain 613 to first client 601 and the link from third domain 613 to second client 602, the vertex 636 between the link from third domain 613 to second client 602 and the link from third domain 613 to third client 603, the vertex 638 between the link from third client 603 to third domain 613 and the link from third client 603 to fourth domain 614, and the vertex 640 between the link from third client 603 to fourth domain 614 and the link from third client 603 to fifth domain 615.

Similarly, the process may be repeated for the next vertex v and its adjacent vertices N(v). For example, in the next iteration, vertex v may be the vertex 632 between the link from first client 611 to second domain 612 and the link from first client 611 to third domain 613. The adjacent vertices N(v) for vertex 632 would be vertex 630, vertex 634, vertex 636, vertex 638, and vertex 640. This process may continue for each vertex until all vertices have been defined with associated adjacent vertices.

Then, for every vertex v, a node degree, an average neighbor node degree, and a median neighbor node degree can be determined using the following equations:

Node degree=$|N(v)|$, where |.| is the set size.

Average neighbor node degree=$1/|N(v)|*\text{sum}\_\{i \in N(v)\}|N(i)|$

Median neighbor node degree=sort($N(v)$),take middle or average of middle two.

Additionally, given the two bipartite graphs 600, 620 from two consecutive time windows, $T\_\{i\}$, $T\_\{i-1\}$, a Jaccard similarity of all vertices in first bipartite graph 600 for the first time window $T\{i\}$ may be defined. The adjacency list for each vertex v in first bipartite graph 600 for first time window $T \{i\}$ may be determined according to the following equation:

$v\_1|A\_1=[v|v \in N(v\_1)$ in graph $T\_\{i\}\}|B\_1=\{v|v \in N(v\_1)$ in graph $T\{i-1\}\}|J\_1=|A\_1$ intersect $B\_1|/|A\_1$ union $B\_1|$;

for vertex 1 of n vertices, and accordingly for each n vertex:

$v\_n=[v|v \in N(v\_1)$ in graph $T\_\{i\}\}|B\_n=\{v|v \in N(v\_1)$ in graph $T\{i-1\}\}|J\_n=|A\_n$ intersect $B\_n|/|A\_n$ union $B\_n|$ where n is the number of vertices in $T\_\{i\}$.

In an exemplary embodiment, first bipartite graph 600 and second bipartite graph 620 may be used to identify one or more suspect clients from the plurality of clients. Suspect clients may be identified on the basis of clients that repeat themselves and that visit the same or similar types of domains. For example, if a client has queried at least two similar domains as at least one other client, and if a client has made a substantially similar number of queries to domains over a defined time window as at least one other client, then the client can be considered to be a suspect client. That is, it is likely that the client is infected with malware and is acting bot-like.

Figure 7:
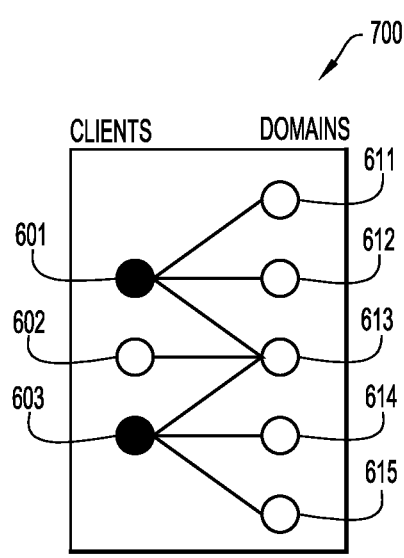
FIG. 7 is a representative view of a bipartite graph with suspect clients identified based on the botnet domain detection techniques described herein, according to an example embodiment.

FIG. 7 illustrates a bipartite graph 700 with suspect clients identified based on the techniques described herein, according to an example embodiment. In this example, first client 601 and third client 603 have been identified as suspect clients based on an analysis of their behavior in querying similar domains and making similar numbers of queries over defined time windows. Second client 602, however, is not identified as a suspect client because its behavior was unlike the behavior of first client 601 and/or third client 603. For example, second client 602 only made one query to a domain, contrasted with three queries made by each of first client 601 and third client 603. Additionally, second client 602 did not query at least two similar domains as first client 601 and/or third client 603.

In an example embodiment, the metrics associated with the relationships between clients and the domains visited by the clients determined from bipartite graphs 600, 620 described above with reference to FIG. 6 may be used to identify the suspect clients. Specifically, client vertices having a high Jaccard similarity metric, $J\_i>C$, for some value of C, along with a median neighbor node degree and average neighbor node degree that are close may be identified as suspect clients. In this example, C may have a value approximately 90% or greater, where the higher the percentage, the greater degree of similarity. Additionally, the degree of closeness between median neighbor node degree (m_c) and average neighbor node degree (a_c) may be defined as: $m\_c/a\_c <k \%$ and $a\_c/m\_c<k \%$.

Using this process, one or more suspect clients of the plurality of clients may be identified. Once the suspect clients have been identified, the stored information related to the suspect clients may be used to determine the domains that have been queried or accessed by the suspect clients. For example, as explained above in reference to operation 508 of method 500. These domains visited by the one or more suspect clients may be considered suspect domains. That is, the domains visited by suspect clients (i.e., clients that appear to be acting bot-like) are considered to be suspected botnet domains. Therefore, these domains are determined to be a subset of suspect domains of the plurality of domains (e.g., plurality of domains 160) for further analysis, described below.

Having determined the subset of suspect domains, the client activity information associated with each of the domains in the subset of suspect domains is obtained, as explained above in regard to operation 510 of method 500. In an example embodiment, obtaining the client activity information for the subset of suspect domains may also include determining associated metrics associated with the relationships between suspect clients and the suspect domains visited by the suspect clients determined from bipartite graphs, as detailed above in regard to FIGS. 6 and 7. For example, these metrics may include domain popularity (i.e., the number of suspect clients querying a suspect domain), node degree, average neighbor node degree, median neighbor node degree, and Jaccard similarity, determined in accordance with the principles described herein.

These metrics may then be the basis for determining three client activity information factors, including the first factor related to the domain's popularity, the second factor related to the client's chattiness, and the third factor related to the client's similarity or Jaccard similarity. The three client activity information factors may be used to determine polytope regions for detecting botnet domains. Further details regarding the determination of values for each factor using the metrics derived from the stored information and client activity information follows below.

In an example embodiment, for each suspect client, an average value ($\mu$) and the associated standard deviation of that value ($\sigma$) are determined for node degree (deg), average neighbor node degree ($\{a\_c\}$), median neighbor node degree ($\{m\_c\}$), and Jaccard similarity (jaccard) metrics. Accordingly, for each suspect client, two vectors may be determined as follows:

Average value $\mu=(\mu\_\{m\_c\},\mu\_\{a\_c\},\mu\_deg,$
$\mu\_jaccard)$

Standard deviation $\sigma=(\sigma\_\{m\_c\},\sigma\_\{a\_c\},\sigma\_deg,$
$\sigma\_jaccard).$ A polytope region of typical domains visited by a suspect client can then be defined within the convex hull of the points, i.e., the intersection of the extent of the average values plus or minus the standard deviation, as follows:

$(\mu\_\{m\_c\}\pm\sigma\_\{m\_c\},\mu\_\{a\_c\}\pm\sigma\_\{a\_c\},$
$\mu\_deg\pm\sigma\_deg,\mu\_jaccard\pm\sigma\_jaccard)$ Additionally, for each suspect domain, the domain popularity average value ($\mu\_pop$) and standard deviation ($\sigma\_pop$) may also be determined from the client activity information.

Figure 8:
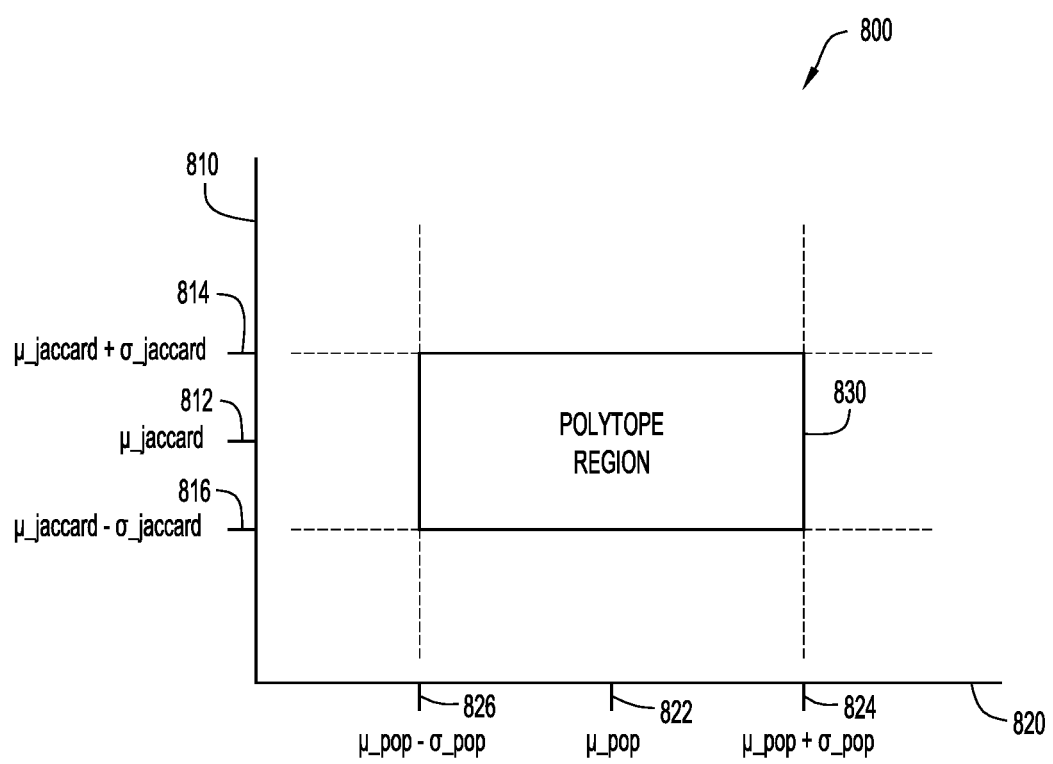
FIG. 8 is a representative view of a two-dimensional polytope region used to determine botnet domains, according to an example embodiment.

FIG. 8 illustrates a graph 800 showing a two-dimensional polytope region 830 that may be used to determine a botnet domain, according to an example embodiment. In this embodiment, two of the three client activity information factors are used to form two-dimensional polytope region 830 for a representative suspect client. In particular, graph 800 is formed by a first axis 810 related to the determined jaccard similarity factor for the representative suspect client, including an average value of the jaccard similarity ($\mu\_jaccard$) and the standard deviation (a jaccard). In this example, along first axis 810, the extent of the jaccard similarity factor for the representative client may be defined as extending from average value ($\mu\_jaccard$) 812, plus standard deviation ($\mu\_jaccard+\sigma$ jaccard) 814 to minus standard deviation ($\mu\_jaccard-\sigma\_jaccard$) 816.

Graph 800 may also include a second axis 820 related to the determined domain popularity factor, including an average value ($\mu\_pop$) and the standard deviation ($\sigma\_pop$). In this example, along second axis 820, the extent of the domain popularity factor may be defined as extending from average value ($\mu\_pop$) 822, plus standard deviation ($\mu\_pop+\sigma\_pop$) 824 to minus standard deviation ($\mu\_pop-\sigma\_pop$) 826. In an example embodiment, the intersection of these two sets forms two-dimensional polytope region 830.

Having determined polytope region 830 defines a likely botnet domain, each domain of the subset of suspect domains may be tested or compared to polytope region 830 for the representative client to determine whether the suspect domain is a botnet domain. For example, the following equation may be used to determine whether a suspect domain is within the polytope region of a suspect client:

$(\{m\_c\},\{a\_c\},deg,jaccard)\in conv\{$
$(\mu\_\{m\_c\}\pm\sigma\_\{m\_c\},\mu\_\{a\_c\}\pm\sigma\_\{a\_c\},$
$\mu\_deg\pm\sigma\_deg,\mu\_jaccard\pm\sigma\_jaccard)\}$ As explained above with regard to operation 516 of method 500, if the result of the comparison is that the suspect domain falls within polytope region 830, then the suspect domain is associated with a group of blocked domains, for example, by being added to blocked domain database 142 (FIG. 1). If the result of the comparison is that the suspect domain falls outside of polytope region 830, then the suspect domain may be removed from the subset of suspect domains. As a result, the removed domain may not be included in blocked domain database 142.

FIG. 8 illustrates two-dimensional polytope region 830 defined by two client activity information factors, jaccard similarity and domain popularity. In an example embodiment, a three-dimensional polytope region may be defined by also considering a suspect client's chattiness. The chattiness factor may be a function of the suspect client's query rate compared to other clients. For example, the client's chattiness factor may be determined as a function of node degree (deg), average neighbor node degree ($\{a\_c\}$), and median neighbor node degree ($\{m\_c\}$). That is, a factor that determines how many queries a client makes in a given time window compared with the average and median values of other clients.

Figure 9:
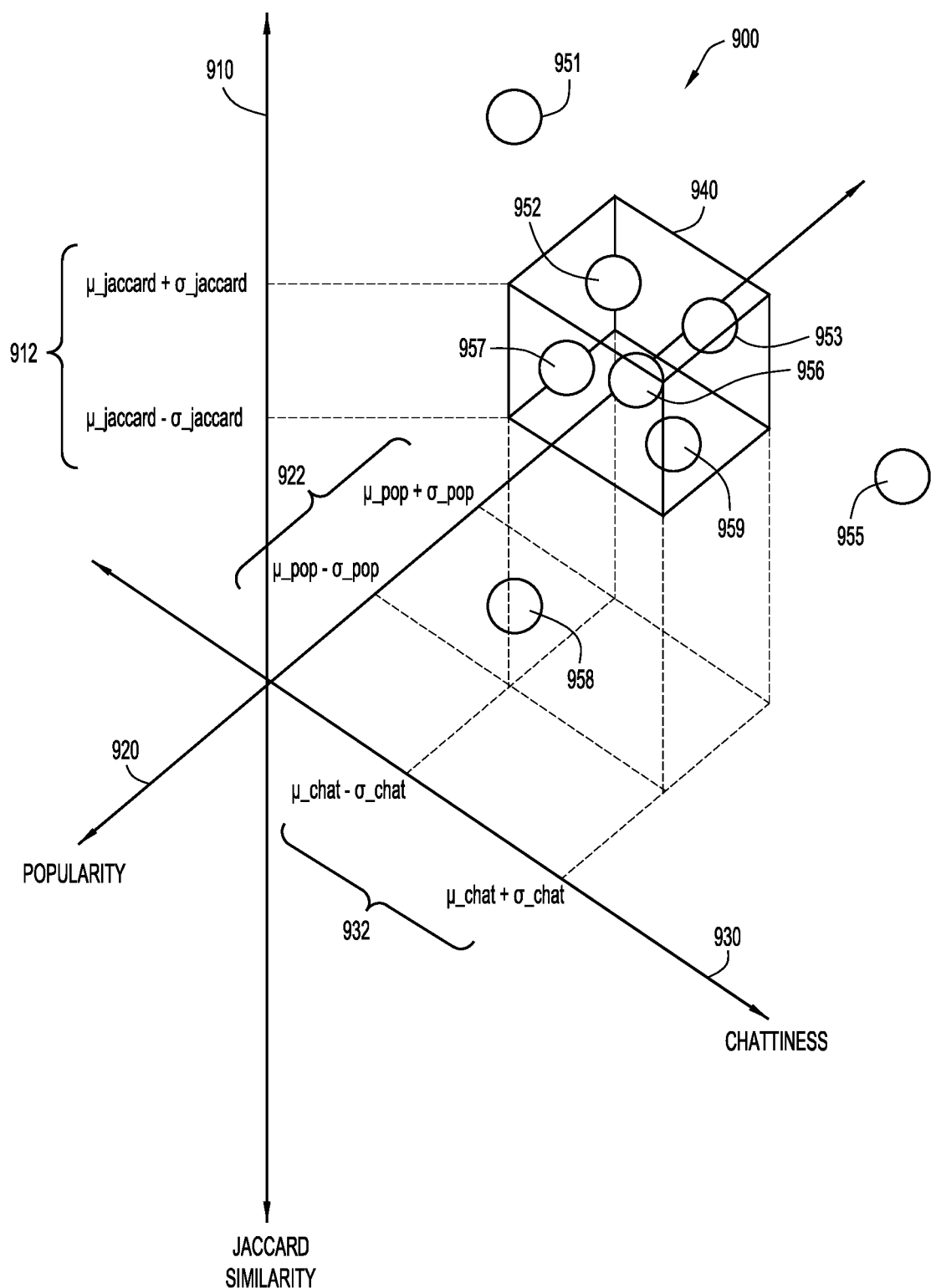
FIG. 9 is a representative view of a three-dimensional polytope region used to determine botnet domains, according to an example embodiment.

Referring now to FIG. 9, a graph 900 showing a three-dimensional polytope region 940 that may be used to determine a botnet domain according to an example embodiment is shown. In this embodiment, graph 900 may be defined by three axes, including a first axis 910, a second axis 920, and a third axis 930. The extent of the value along each of the three axes 910, 920, 930 intersects in a cubic space that defines polytope region 940. In this example, first axis 910 is related to the determined jaccard similarity factor for the representative suspect client, including an average value of the jaccard similarity ($\mu\_jaccard$) and the standard deviation ($\sigma\_jaccard$). In this example, along first axis 910, extent 912 of the jaccard similarity factor for the representative client may be defined as extending from the average value ($\mu\_jaccard$) plus or minus the standard deviation ($\mu\_jaccard\pm\sigma\_jaccard$).

Graph 900 also include second axis 920 related to the determined domain popularity factor, including an average value ($\mu\_pop$) and the standard deviation ($\sigma\_pop$). In this example, along second axis 920, extent 922 of the domain popularity factor may be defined as extending from the average value ($\mu\_pop$) plus or minus the standard deviation ($\mu\_pop\pm\sigma\_pop$).

In contrast to graph 800 in FIG. 8, graph 900 further includes third axis 930 related to the determined client chattiness, including an average value ($\mu\_chat$) and the standard deviation ($\sigma\_chat$). In this example, along third axis 930, extent 932 of the client chattiness factor may be defined as extending from the average value ($\mu\_chat$) plus or minus the standard deviation ($\mu\_chat\pm\sigma\_chat$).

In this embodiment, the intersection of the extent of each factor along the three axes 910, 920, 930, including extent 912, extent 922, and extent 932, defines three-dimensional polytope region 940. As previously discussed, for each suspect domain tested for a given suspect client, if the suspect domain falls within cubic polytope region 940, then that suspect domain is considered to be a likely botnet domain. Accordingly, it may be associated with other blocked domains by being added to blocked domain database 142 (FIG. 1). In the event that a suspect domain does not fall within cubic polytope region 940, then the domain may be removed from the subset of suspect domains and will not be included with the blocked domains in blocked domain database 142.

For example, in this embodiment, consider the subset of suspect domains that includes a first domain 951, a second domain 952, a third domain 953, a fourth domain 954, a fifth domain 955, a sixth domain 956, a seventh domain 957, an eighth domain 958, and a ninth domain 959. Comparing each suspect domain to polytope region 940 for the representative suspect client of graph 900, results in second domain 952, third domain 953, fourth domain 954, sixth domain 956, seventh domain 957, and ninth domain 959 falling within polytope region 940. Each of these domains may then be added to blocked domain database 142 as likely botnet domains.

In contrast, in this example first domain 951, fifth domain 955, and eighth domain 958 fall outside of polytope region 940. Each of these domains may be removed from the subset of suspect domains. As a result, domains 951, 955, and 958 will not be included with the blocked domains in blocked domain database 142.

After comparing suspect domains to a polytope region for a given suspect client, another polytope region may be determined for another suspect client. The process described above may then be repeated for each of the suspect clients. For example, consider a set of n suspect clients, then a polytope region would be determined for each n suspect client and each suspect domain tested with the polytope region for n suspect clients.

The principles of the example embodiments described herein can facilitate detection of botnet domains. With the botnet domain detection techniques described herein, likely botnet domains used by botnet masters to send command and control messages or otherwise control infected botnet clients may be may be appropriately blocked or disabled.

In summary, a computer-implemented method is provided comprising: monitoring network traffic associated with a plurality of clients in a network; based on the monitoring, storing information related to a plurality of domains that are queried by the plurality of clients; identifying one or more suspect clients of the plurality of clients in the network based on the stored information; determining a subset of suspect domains of the plurality of domains based on the stored information related to the plurality of domains queried by the one or more suspect clients; based on the monitoring and the storing, determining client activity information related to: (i) a number of clients querying each domain of the subset of suspect domains, (ii) identities of the clients querying each domain of the subset of suspect domains, (iii) a number of total domains each of the clients queries over a defined time window, and (iv) for each domain of the subset of suspect domains, a proportion of the clients that query that domain over two consecutive time windows; determining a polytope region for a first client of the one or more suspect clients based on the client activity information; comparing each domain of the subset of suspect domains to the polytope region for the first client; and associating a domain of the subset of suspect domains with a group of blocked domains if the domain falls within the polytope region for the first client.

In addition, a non-transitory computer readable storage media encoded with instructions that, when executed by a processor, cause the processor to perform operations is provided comprising: monitoring network traffic associated with a plurality of clients in a network; based on the monitoring, storing information related to a plurality of domains that are queried by the plurality of clients; identifying one or more suspect clients of the plurality of clients in the network based on the stored information; determining a subset of suspect domains of the plurality of domains based on the stored information related to the plurality of domains queried by the one or more suspect clients; based on the monitoring and the storing, determining client activity information related to: (i) a number of clients querying each domain of the subset of suspect domains, (ii) identities of the clients querying each domain of the subset of suspect domains, (iii) a number of total domains each of the clients queries over a defined time window, and (iv) for each domain of the subset of suspect domains, a proportion of the clients that query that domain over two consecutive time windows; determining a polytope region for a first client of the one or more suspect clients based on the client activity information; comparing each domain of the subset of suspect domains to the polytope region for the first client; and associating a domain of the subset of suspect domains with a group of blocked domains if the domain falls within the polytope region for the first client.

Furthermore, an apparatus is provided comprising: a communication interface configured to enable network communications; and a processor coupled with the communication interface, and configured to: monitor network traffic associated with a plurality of clients in a network; based on the monitoring, store information related to a plurality of domains that are queried by the plurality of clients; identify one or more suspect clients of the plurality of clients in the network based on the stored information; determine a subset of suspect domains of the plurality of domains based on the stored information related to the plurality of domains queried by the one or more suspect clients; based on the monitoring and the storing, determine client activity information related to: (i) a number of clients querying each domain of the subset of suspect domains, (ii) identities of the clients querying each domain of the subset of suspect domains, (iii) a number of total domains each of the clients queries over a defined time window, and (iv) for each domain of the subset of suspect domains, a proportion of the clients that query that domain over two consecutive time windows; determine a polytope region for a first client of the one or more suspect clients based on the client activity information; compare each domain of the subset of suspect domains to the polytope region for the first client; and associate a domain of the subset of suspect domains with a group of blocked domains if the domain falls within the polytope region for the first client.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
   monitoring network traffic associated with a plurality of clients in a network;
   based on the monitoring, storing information related to a plurality of domains that are queried by the plurality of clients;
   identifying one or more suspect clients of the plurality of clients in the network based on the stored information;
   determining a subset of suspect domains of the plurality of domains based on the stored information related to the plurality of domains queried by the one or more suspect clients;
   based on the monitoring and the storing, determining client activity information related to: (i) a number of clients querying each domain of the subset of suspect domains, (ii) identities of the clients querying each domain of the subset of suspect domains, (iii) a number of total domains each of the clients queries over a defined time window, and (iv) for each domain of the subset of suspect domains, a proportion of the clients that query that domain over two consecutive time windows;

determining a polytope region for a first client of the one or more suspect clients based on the client activity information;

comparing each domain of the subset of suspect domains to the polytope region for the first client;

associating at least a first domain of the subset of suspect domains with a group of blocked domains if the first domain falls within the polytope region for the first client; and blocking at least one of a query or an access attempt by one of the plurality of clients to the first domain.

2. The method of claim 1, wherein the stored information related to the plurality of domains comprises domain name system (DNS) records.

3. The method of claim 2, wherein the DNS records include at least a requestor client Internet Protocol (IP) address and a requested domain.

4. The method of claim 1, wherein identifying the one or more suspect clients includes comparing a relationship between clients in the network with domains queried by clients over consecutive time windows.

5. The method of claim 4, wherein comparing the relationship between clients with domains queried by those clients includes determining that a client is a suspect client when: (i) the client has queried at least two similar domains of the plurality of domains as at least one other client, and (ii) the client has made a substantially similar number of queries to the plurality of domains over a defined time window as at least one other client.

6. The method of claim 1, further comprising:
determining a polytope region for each client of the one or more suspect clients based on the client activity information;
comparing each domain of the subset of suspect domains to the polytope region for each client of the one or more suspect clients; and
wherein the associating includes associating a domain of the subset of suspect domains with the group of blocked domains if the domain falls within the polytope region of any of the one or more suspect clients.

7. The method of claim 1, further comprising removing a domain of the subset of suspect domains from the subset of suspect domains if the domain falls outside of the polytope region for the first client.

8. A non-transitory computer readable storage media encoded with instructions that, when executed by a processor, cause the processor to perform operations comprising:
monitoring network traffic associated with a plurality of clients in a network;
based on the monitoring, storing information related to a plurality of domains that are queried by the plurality of clients;
identifying one or more suspect clients of the plurality of clients in the network based on the stored information;
determining a subset of suspect domains of the plurality of domains based on the stored information related to the plurality of domains queried by the one or more suspect clients;
based on the monitoring and the storing, determining client activity information related to: (i) a number of clients querying each domain of the subset of suspect domains, (ii) identities of the clients querying each domain of the subset of suspect domains, (iii) a number of total domains each of the clients queries over a defined time window, and (iv) for each domain of the subset of suspect domains, a proportion of the clients that query that domain over two consecutive time windows;

determining a polytope region for a first client of the one or more suspect clients based on the client activity information;

comparing each domain of the subset of suspect domains to the polytope region for the first client;

associating at least a first domain of the subset of suspect domains with a group of blocked domains if the first domain falls within the polytope region for the first client; and blocking at least one of a query or an access attempt by one of the plurality of clients to the first domain.

9. The non-transitory computer readable storage media of claim 8, wherein the stored information related to the plurality of domains comprises domain name system (DNS) records.

10. The non-transitory computer readable storage media of claim 9, wherein the DNS records include at least a requestor client Internet Protocol (IP) address and a requested domain.

11. The non-transitory computer readable storage media of claim 8, wherein identifying the one or more suspect clients includes comparing a relationship between clients in the network with domains queried by clients over consecutive time windows.

12. The non-transitory computer readable storage media of claim 11, wherein comparing the relationship between clients with domains queried by those clients includes determining that a client is a suspect client when: (i) the client has queried at least two similar domains of the plurality of domains as at least one other client, and (ii) the client has made a substantially similar number of queries to the plurality of domains over a defined time window as at least one other client.

13. The non-transitory computer readable storage media of claim 8, further comprising instructions that cause the processor to:
determine a polytope region for each client of the one or more suspect clients based on the client activity information;
compare each domain of the subset of suspect domains to the polytope region for each client of the one or more suspect clients; and
associate a domain of the subset of suspect domains with the group of blocked domains if the domain falls within the polytope region of any of the one or more suspect clients.

14. The non-transitory computer readable storage media of claim 8, further comprising instructions for removing a domain of the subset of suspect domains from the subset of suspect domains if the domain falls outside of the polytope region for the first client.

15. An apparatus comprising:
a communication interface configured to enable network communications; and
a processor coupled with the communication interface, and configured to:
monitor network traffic associated with a plurality of clients in a network;
based on the monitoring, store information related to a plurality of domains that are queried by the plurality of clients;

identify one or more suspect clients of the plurality of clients in the network based on the stored information;

determine a subset of suspect domains of the plurality of domains based on the stored information related to the plurality of domains queried by the one or more suspect clients;

based on the monitoring and the storing, determine client activity information related to: (i) a number of clients querying each domain of the subset of suspect domains, (ii) identities of the clients querying each domain of the subset of suspect domains, (iii) a number of total domains each of the clients queries over a defined time window, and (iv) for each domain of the subset of suspect domains, a proportion of the clients that query that domain over two consecutive time windows;

determine a polytope region for a first client of the one or more suspect clients based on the client activity information;

compare each domain of the subset of suspect domains to the polytope region for the first client;

associate at least a first domain of the subset of suspect domains with a group of blocked domains if the first domain falls within the polytope region for the first client; and block at least one of a query or an access attempt by one of the plurality of clients to the first domain.

16. The apparatus of claim 15, wherein identifying the one or more suspect clients includes comparing a relationship between clients in the network with domains queried by clients over consecutive time windows.

17. The apparatus of claim 16, wherein comparing the relationship between clients with domains queried by those clients includes determining that a client is a suspect client when: (i) the client has queried at least two similar domains of the plurality of domains as at least one other client, and (ii) the client has made a substantially similar number of queries to the plurality of domains over a defined time window as at least one other client.

18. The apparatus of claim 15, wherein the processor is configured to:

determine a polytope region for each client of the one or more suspect clients based on the client activity information;

compare each domain of the subset of suspect domains to the polytope region for each client of the one or more suspect clients; and associate a domain of the subset of suspect domains with the group of blocked domains if the domain falls within the polytope region of any of the one or more suspect clients.

19. The apparatus of claim 15, wherein the plurality of clients and the apparatus are on the same network.

20. The apparatus of claim 15, wherein the apparatus is located outside the network that includes the plurality of clients.

* * * * *